United States Patent [19]

Seragnoli

[11] Patent Number: 5,736,832
[45] Date of Patent: Apr. 7, 1998

[54] MULTIPLE FUNCTION BATTERY CHARGER, SELF-CONFIGURING AS SUPPLY VOLTAGE REGULATOR FOR BATTERY POWERED APPARATUSES

[75] Inventor: Giordano Seragnoli, Agrate Brianza, Italy

[73] Assignee: SGS-Thomson Microelectronics S.r.l., Agrate Brianza, Italy

[21] Appl. No.: 662,779

[22] Filed: Jun. 7, 1996

[30] Foreign Application Priority Data

Jun. 7, 1995 [EP] European Pat. Off. ............ 95830239

[51] Int. Cl.$^6$ .......................... H01M 10/44; H01M 10/46
[52] U.S. Cl. .................................... 320/21; 320/49
[58] Field of Search ..................... 320/5, 21, 22, 320/26, 29, 30, 32, 39, 49, 54

[56] References Cited

U.S. PATENT DOCUMENTS

| | | | |
|---|---|---|---|
| 3,678,363 | 7/1972 | Ringle | 320/39 X |
| 4,386,310 | 5/1983 | Sievers | 322/28 |
| 4,554,500 | 11/1985 | Sokira | 320/31 |
| 4,607,208 | 8/1986 | Vreeland | 320/21 |
| 5,576,608 | 11/1996 | Nagai et al. | 320/22 |

*Primary Examiner*—Edward Tso
*Attorney, Agent, or Firm*—Raymond M. Galasso; Jenkens & Gilchrist; Alberto Pellegri

[57] ABSTRACT

Regulation of the output supply voltage to a load powered by a rechargeable battery of a portable apparatus, typically a telephone, is advantageously implemented by exploiting the switching STEP-DOWN REGULATOR of an in-built battery charger. The regulator circuit configures itself in function of the voltage level at the regulator input to retain an unmodified constant current and constant voltage battery charger function as long as a sufficiently high voltage source is connected to the input. Otherwise the battery voltage is applied to the input of the regulator and configuring means modify automatically the partition ratio of an output voltage sensing divider of the voltage-mode control loop of the charger, isolate the battery pole from the output and disable the current-mode control loop of the charger.

18 Claims, 2 Drawing Sheets

MULTIPLE FUNCTION BATTERY CHARGER, SELF-CONFIGURING AS SUPPLY VOLTAGE REGULATOR FOR BATTERY POWERED APPARATUSES

TECHNICAL FIELD

This invention is concerned with a battery charger system for portable electronic apparatuses, functioning in a switching mode under constant current and constant voltage control modes, which is also structured as a supply voltage regulator for the portable apparatus circuit.

BACKGROUND OF THE INVENTION

Lithium rechargeable batteries (lithium ion or lithium metal batteries) provide for higher performances compared to those of NiCd or NiMH rechargeable batteries, for example in terms of a greater capacity, expressed in Amperehour, for the same volume and in terms of a charge characteristic that does not require particular contrivances in order to avert overcoming the maximum permissible charging condition.

By contrast, a lithium cell voltage varies considerably according to its state of charge, going from a minimum of a 2.7 Volts when a cell is completely discharged to a maximum of 4.2 Volts when a cell is fully charged. In some conditions of use, as for example in the case of portable telephones, the supply voltage required for the circuits that constitute the load of the powering lithium batteries may be nominally of 5.0 Volts. In this case, the battery pack must contain at least two cells and therefore the battery voltage can vary between 5.4 Volts when the battery is completely discharged and 8.4 Volts when the battery is fully charged. This broad range of variation of the battery voltage may represent a critical parameter and become dangerous to the integrity of the powered integrated circuits.

In many applications involving lithium or other type of rechargeable batteries, in order to avoid excessive supply voltage conditions in a fully charged battery, it might be necessary to interpose a voltage regulating circuit between the battery and the load circuits so that the load circuit can be powered at an almost constant supply voltage, lower or at most equal to the minimum voltage of a substantially discharged battery, regardless the battery state of charge. The necessity of a voltage regulator is even more stringent in the case of a load electronic circuit that has to be necessarily powered at nominally 3 Volts, as required by modern electronics systems of elevated scale of integration.

Naturally this implies the inclusion of an appropriate dedicated circuit, downstream of the rechargeable battery, in the portable apparatus. In addition, many apparatuses also incorporate the entire battery charger system or at least a control circuit of the constant current charging process and of the constant voltage trickle charging process for preventing damage of the battery if left under charge after reaching a certain maximum charge cell voltage.

SUMMARY OF THE INVENTION

The present invention is directed towards providing a dual-function, unified system for charging the battery by normally controlling the charging current in a constant current control mode until reaching a state of substantial charge of the battery. When the charge process is practically completed, the voltage source in a constant voltage control mode is capable of configuring itself automatically so as to perform as a voltage regulator of the voltage supplied to the battery-powered circuits (load). The voltage regulator performs upon disconnection from the mains or from any other suitable external source of a recharging current, and vice versa upon connection to the external electrical source.

In practice, a unique regulation system automatically configures itself as a battery charger and as supply voltage regulator, thus reducing drastically the number of components used and costs.

The possibility of obtaining a dual recharger and regulator function by an unique electronics system promotes integration of the battery charger system in the portable apparatus, exploiting the same control circuit for regulating the supply voltage of the functional circuits of the apparatus.

Of course, the dual function system of the invention can also be useful in NiCd or NiMH batteries powered apparatuses or using any other type of rechargeable batteries that because of their characteristics require regulation of the supply voltage for compensating cell voltage variation in function of the state of charge.

This invention is realized in one embodiment by employing the same STEP-DOWN switching mode regulator of a battery charger circuit, typically controlled by a first current-mode feedback loop and by a second voltage-mode feedback loop. The battery voltage is applied to the regulator input when the functional circuits of the portable apparatus are being powered by the battery. Additionally, the circuits automatically disable the current-mode feedback loop and exploit the voltage-mode feedback loop, thereby modifying the ratio of the output voltage divider thereof so as to regulate the output voltage at the value required by the powered circuits.

Configuration of the circuit as battery charger or as voltage regulator is automatic upon the application of a voltage higher that a certain minimum value related to the type of battery for charging the battery or its disconnection from the input node of the STEP-DOWN regulator, respectively.

BRIEF DESCRIPTION OF THE DRAWINGS

These and other aspects and advantages of this invention will be more evident through the following description of an important embodiment and by referring to the annexed drawings.

DETAILED DESCRIPTION OF THE INVENTION

It is common knowledge that a battery, for instance a lithium battery, can be charged by a preestablished constant current. During the charge, the battery voltage Vbatt for a two cell battery pack rises from a minimum value of about 5.4 Volts for a completely discharged battery up to a maximum value of about 8.4 Volts. It is very important not to go over 8.4 Volts in order not to compromise the cells integrity.

Therefore, once the preestablished maximum value of the battery voltage is reached, which in the case of a lithium battery can be of 8.4 Volts, the charging system must switch from a mode of operation as a generator of a constant current to a mode of operation as a source of a constant voltage. Charging of the battery continues also during this terminal phase of the charging process at a constant voltage. In this phase, the current absorbed by the battery gradually drops to zero. In this way, the battery may remain coupled to the electrical recharging source indeterminately, eventually absorbing a trickle current without any negative effect on its integrity.

Figure 1:
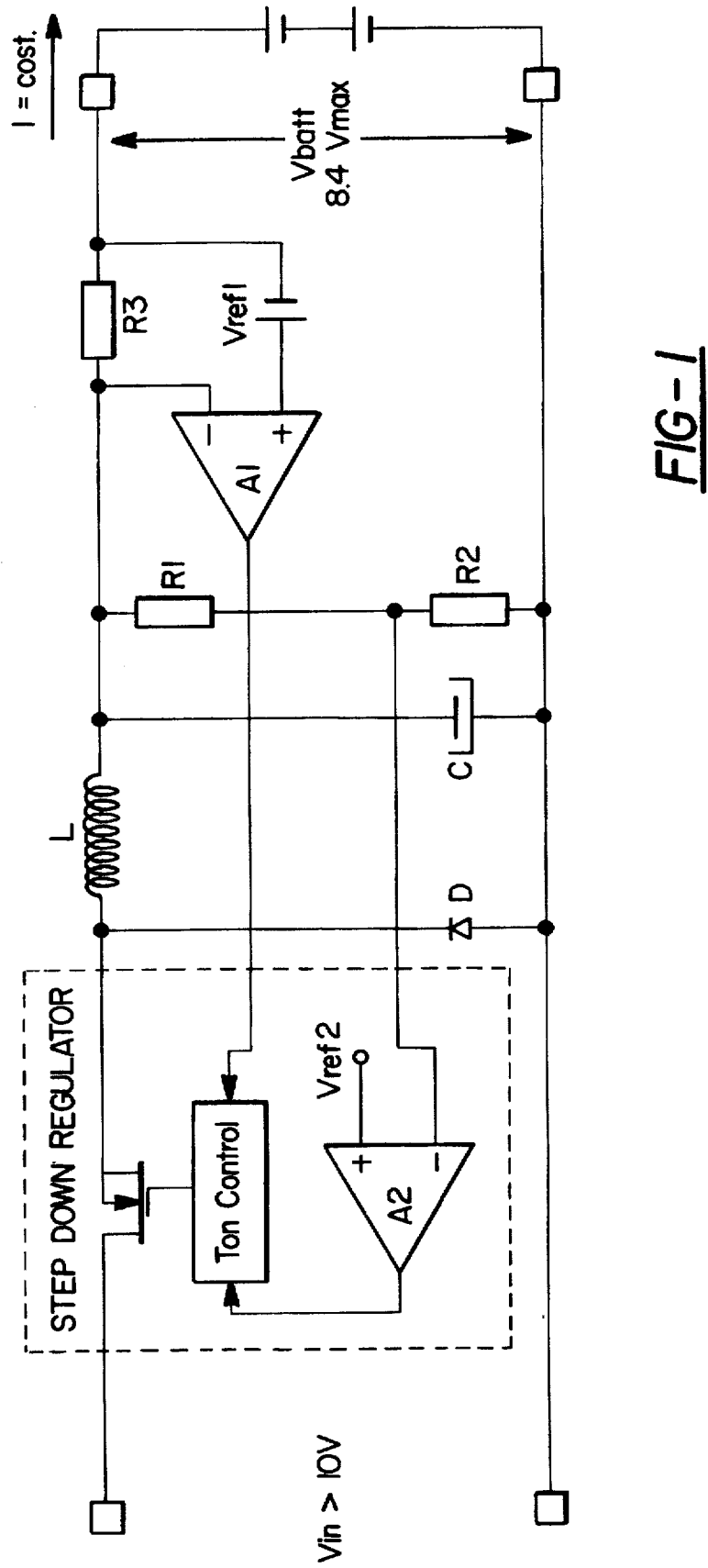
FIG. 1 shows a scheme of a constant current and constant voltage battery charger circuit.

A charger circuit is shown in FIG. 1.

The circuit, as indicated in FIG. 1, substantially comprises a STEP-DOWN switching regulator, a current limiting inductor L, a filter capacitor C, a current recirculation diode D for discharging the inductor L during an nonconductive phase of the power switch of the regulator.

The conduction interval, or duty-cycle of the switch, which as shown in the scheme of FIG. 1 may be an isolated-gate power MOS transistor, is controlled by a driving logic circuit Ton Control. The regulation of the duty-cycle is effected by employing a first current-mode feedback loop, composed of a sensing resistance R3 for monitoring the charging current and a first error amplifier A1, the signal produced by which is processed by the control logic circuitry Ton Control. Driving logic circuit Ton Control is a type of circuit that is well known in the art and this type of circuit is used in prior art battery charging devices. The internal details of this circuit do not constitute the present invention of and any suitable such circuit is acceptable. A person of skill in the art would be able to use known Ton Control circuits to provide the required signals based on the disclosure of the present invention.

The loop regulates the charging current as a function of a predefinable value set by Vref1, during the battery charging process up to reaching a maximum charge voltage set by Vref2.

When this preestablished maximum battery voltage Vbatt is reached, the second voltage-mode feedback loop, composed of a voltage divider R1-R2 of the regulated output voltage and a second error amplifier A2, whose output signal is processed by the control logic circuitry Ton Control, takes over the control of the switch duty-cycle, so as to keep constant the output voltage of the STEP-DOWN regulator at the preestablished value. The preestablished value is equal to the maximum admissible battery voltage.

The input voltage Vin of the battery charger can be a nonregulated rectified voltage, or a car battery voltage, whose value should necessarily be higher than the maximum charge voltage of the battery pack. The nonregulated input voltage Vin can be the filtered output voltage of a rectifying diode bridge, coupled to the secondary winding of a transformer or any other DC voltage source of a voltage higher than the maximum charge voltage of the battery pack to be charged.

Figure 2:
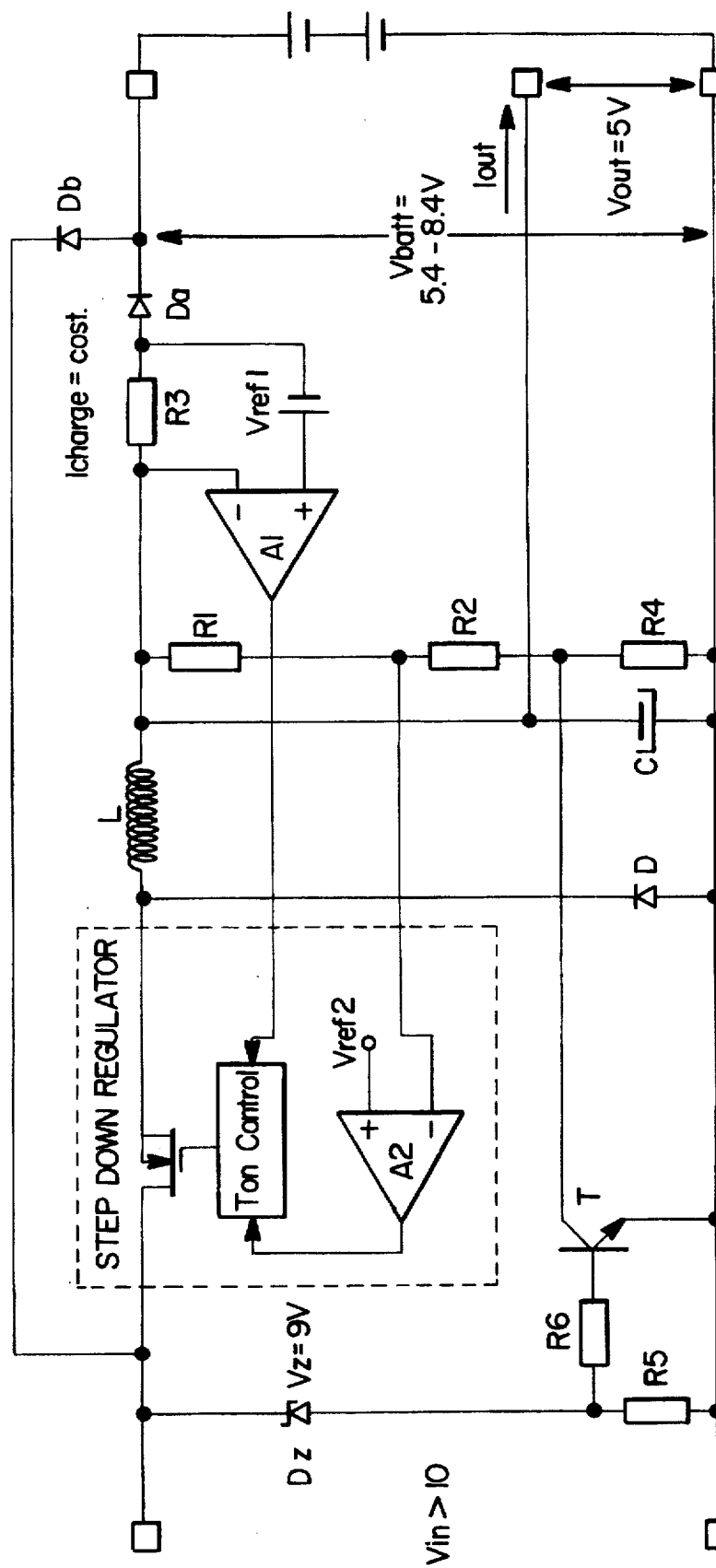
FIG. 2 shows a dual-function circuit realized according to the present invention.

The embodiment of this invention for a battery charger circuit as the one shown in FIG. 1, is depicted in FIG. 2.

This example shows the case of a lithium battery pack composed of two cells, where the battery voltage Vbatt varies from about 5.4 to about 8.4 Volts and the nonregulated input voltage Vin of the switching step-down regulator must be higher than about 10 Volts.

As in the case of the circuit of FIG. 1, the two feedback loops, of the constant current and constant voltage control modes, implement initially a regulation of the charging current and, during a conclusive phase of the charging process, a regulation of the charging voltage. Consequently, the two feedback loops control alternatively the duty-cycle of the STEP-DOWN regulator switch, that is the periodic conduction interval Ton of the power MOS transistor during which the Vin input voltage is applied directly to the inductance L.

When the switch is not conducting, the energy stored in the inductance L is discharged by recirculating a current through the diode D.

During a conduction interval Ton, the current that flows in the inductor L grows linearly with time according to the equation:

$$I = \frac{(Vin - Vbatt)Ton}{L} \quad (1)$$

In view of the fact that Vin can be an inconstant voltage and that Vbatt varies according to the state of charge of the battery, the regulation of the charge current I takes place by suitably regulating the time interval Ton so as to cause the system to deliver a constant current that can be set by adjusting the value of Vref1.

To this purpose, the current-mode feedback loop senses continuously the voltage drop provoked by the current I on the resistance R3. Such a drop is compared with a reference voltage Vref1 and the difference is amplified by the error amplifier A1 that acts directly on the time Ton of the STEP-DOWN REGULATOR in order to fulfill the following relation:

$$I \cdot R3 = Vref1 \quad (2)$$

that is keeping the current I constant.

By combining equations (1) and (2), we obtain:

$$Ton = \frac{Vref1 \cdot L}{R3(Vin - Vbatt)} \quad (3)$$

where it can be noticed that Ton must always be inversely proportional, instant by instant, to the voltage difference Vin-Vbatt.

During the charging, the battery voltage Vbatt increases in time. Such a voltage is sensed continuously by means of a resistive voltage divider R1, R2 and compared with a reference voltage Vref2.

When the equation below is satisfied:

$$\frac{Vbatt \cdot R2}{R1 + R2} = Vref2 \quad (4)$$

the error amplifier A2 acts on the time Ton of the STEP-DOWN REGULATOR in such a way as to fulfill the equation (4), thus keeping constant the voltage Vbatt.

It can be demonstrated that in this functioning mode at a constant voltage, the relation that ties Ton to the preestablished maximum charge value of the battery voltage Vbatt is:

$$Ton = \frac{Vbatt}{Vin} \cdot T \quad (5)$$

where T is the period of the switching frequency of the regulator that may commonly be from ten to several hundreds KHz.

Therefore the time Ton is regulated by the current-mode feedback loop, according to equation (3), during a phase of delivery of a constant current and by the voltage-mode feedback loop, according to equation (5), during a phase of providing a constant output voltage.

The two feedback loops "act" alternatively, in function of the voltage Vbatt.

As it can be observed, during a battery charging phase, that is when the input of the regulator is applied a voltage Vin sufficiently high, the functioning of the battery charger system of the invention shown in FIG. 2 is at all similar to that of the normal circuit of FIG. 1.

Indeed, since the input voltage Vin is greater than the voltage output by the STEP-DOWN regulator of the battery charger output, the diode Db is reversely biased and therefore totally ininfluent. Moreover, due to the persistence of a voltage Vin>10V greater than a given value, the bias line constituted by the zener diode Dz and by the resistance R5, keeps the transistor T in a conductive state so that it substantially short-circuits the resistance R4 connected in series with the divider R1–R2 of the regulated output voltage of the battery charger (see FIG. 1), making ininfluent the presence of the resistance R4 in relation to the normal functioning of the battery charger system. The zener voltage is lower than the minimum value of the input voltage Vin needed to charge the battery.

Only the presence of an added isolation diode Da, with respect to the basic circuit of FIG. 1, must be accounted for by modifying appropriately the ratio between the resistances R1 and R2 of the output voltage divider in consideration of the voltage drop on the isolation diode Da. In practical terms the following relationship should be verified:

$$Vref2 \left( 1 + \frac{R1}{R2} \right) - V_{DA} - I \cdot R3 = Vbatt = 8.4 \text{ V} \tag{6}$$

where $V_{DA}$ is the voltage drop of the diode Da due to the constant charge current I.

Therefore, by assuming the battery has a substantially null load during a recharging phase, that is in absence of a nonnegligible absorption of current by the battery powered load circuits, the functioning of the system in a battery charging phase is a replica of that of the basic circuit shown in FIG. 1.

When the battery charger is disconnected from the source of the input voltage Vin, the circuit configures itself as a regulator of the supply voltage Vout at which the load circuits are powered, at a preestablished value, lower than the battery charge voltage Vout<Vbatt, as for example Vout=5v.

Indeed, by not being any longer present an input voltage Vin greater than a threshold value Vin>10V, the battery voltage Vbatt is applied through the now conductive diode Db to the input node of the regulator STEP-DOWN REGULATOR. The diode Da, being reversely biased, blocks the flowing of a current along the charging line of the battery, through the sensing resistance R3, thus practically disabling the current-mode control loop of the system.

In addition, being the battery voltage Vbatt lower than the zener voltage of the diode Dz, the latter is in an off condition and consequently the transistor T is also in an off condition. In these conditions, the resistance R4 is effectively connected in series to R2, thus modifying the partition ratio of the output voltage sensing divider and therefore the error signal sensed by the amplifier A2 of the regulator.

Therefore, the output voltage Vout will have a value given by:

$$Vout = Vref2 \left( 1 + \frac{R1}{R2 + R4} \right) = 5 \text{ V} \tag{7}$$

The values of R1 and R2 must be chosen according to the equation (6) that fixes the battery maximum charge voltage, while the value of R4 is dictated by equation (7) that fixes the output voltage of the system as a regulator of the supply voltage.

Because Vout<Vbatt, the diode Da remains in a reverse bias state and therefore the battery voltage does not affect the output voltage Vout.

Therefore, the output current Iout is determined only by the characteristics of the load connected to Vout and eventually limited to a maximum value deliverable by the regulator STEP-DOWN REGULATOR.

By employing a diode Db of the Schottky type, that is a diode with a particularly low direct voltage drop and a power switch of the STEP-DOWN REGULATOR realized with a low $R_{DSON}$ power MOS transistor fabrication technology, it is possible to maintain constant Vout=5V for the whole charge voltage range of a lithium battery, 8.4 Vmax, 5.4 Vmin.

The circuit of FIG. 2 is capable to operate as a battery charger and as a output voltage regulator when powering the load circuits with the battery.

The same system, eventually provided with common sensing devices of the voltage characteristic changes of the battery with time and/or of the battery pack temperature during the recharge process, can be advantageously employed also for batteries of the NiCd and NiMH type. Clearly, the utility of the system of this invention is not limited to the case of lithium batteries.

I claim:

1. A process for charging a battery at a constant current during at least a first phase of the charging process and at a constant voltage during a conclusive or charge maintenance phase of the charging process by means of a charging circuit employing a STEP DOWN switching regulator, the switch duty-cycle of which being controlled by a first current-mode loop and by a second voltage-mode loop, and for powering a battery load at a regulated supply voltage, wherein using the same STEP-DOWN switching regulator of the battery charger, the process comprising the steps of:

producing a regulated supply voltage output, by configurably applying the battery voltage to an input node of said regulator;

disabling said first current-mode loop; and regulating the duty-cycle of the regulator switch through said second voltage-mode loop while modifying the partition ratio of an output voltage sensing divider of the regulator by configurably connecting in series to the sensing divider a resistance which is short-circuitable via a transistor controlled by the level of the input voltage; and applying the battery voltage to the input of said regulator by connecting a diode between the relative battery pole and the input node of the regulator and reversely biasing the diode during a battery recharging phase, when on the input node is applied a recharging voltage higher than the battery voltage.

2. A process for charging a battery at a constant current during at least a first phase of the charging process and at a constant voltage during a conclusive or charge maintenance phase of the charging process by means of a charging circuit employing a STEP DOWN switching regulator, the switch duty-cycle of which being controlled by a first current-mode loop and by a second voltage-mode loop, and for powering a battery load at a regulated supply voltage, wherein using the same STEP-DOWN switching regulator of the battery charger, the process comprising the steps of:

producing a regulated supply voltage output, by configurably applying the battery voltage to an input node of said regulator;

disabling said first current-mode loop; and regulating the duty-cycle of the regulator switch through said second voltage-mode loop while modifying the partition ratio of an output voltage sensing divider of the regulator by configurably connecting in series to the sensing divider a resistance which is short-circuitable via a transistor controlled by the level of the input voltage; and isolating said battery pole from an output node of the regulator during a load powering phase by connecting a diode between said output node and said battery pole and inversely biasing the diode during a phase of load powering and in absence of a recharging voltage higher than the battery voltage at said regulator input node.

3. A dual-function circuit for charging a battery and regulating the supply voltage delivered to the battery load comprising;

a step-down switching regulator;

a current limiting inductor;

a filter capacitor;

a current recirculation diode for discharging the inductor during a nonconducting phase of a switch of the regulator;

a first current-mode control loop having a current sensing resistance;

a first error amplifier for controlling through a logic circuit the duty-cycle of said switch in function of the voltage drop on said resistance;

a second voltage-mode control loop including a regulated output voltage sensing divider;

a second error amplifier for controlling through said logic circuit the duty-cycle of said switch in function of the output voltage;

at least one resistance connected in series to said voltage divider;

at least a first isolation diode coupled between said current sensing resistance and the relative battery pole;

at least a second diode coupled between said battery pole and an input node of said regulator; and at least a transistor for short-circuiting said resistance in response to the presence on said input node of a voltage higher than the battery voltage, controlled by a biasing line comprising at least a zener diode and a resistance connected in series between said input node and a common potential node of the circuit.

4. The dual-function circuit of claim 3 wherein at least said second diode is a Schottky diode having a relatively low direct voltage drop and said switch is a power MOS transistor of relatively low conduction resistance.

5. The dual-function circuit of claim 3 wherein said battery charger circuit is a portable telephone apparatus powered by a rechargeable battery pack, incorporating a battery charger.

6. The dual-function circuit of claim 5 wherein said rechargeable battery is a battery having at least two Lithium cells in series.

7. A battery charger device for charging a battery cell, comprising:

an external voltage supply;

a switching regulator circuit coupled to said external voltage supply;

an inductive element having a first terminal and a second terminal, said first terminal is coupled to said regulator circuit;

a comparator circuit coupled between said second terminal and an input terminal of said battery cell;

a voltage divider having an input node, an output node, and an intermediate node, said input node is coupled to said second terminal, said intermediate node is coupled to said regulator circuit, and said output node is coupled to a reference potential;

a first diode coupled between said comparator circuit and said battery cell; and a filter element coupled between said second terminal and said reference potential and having an output coupled to said battery cell input terminal; and a charge voltage switch coupled between said external voltage supply and said reference potential, wherein said switch activates a capping charge voltage value to said battery cell input terminal after said external voltage supply is off.

8. The device of claim 7 wherein said comparator circuit supplies an initial charge voltage value greater than said capping charge voltage value to said battery cell input terminal when said external voltage supply is active.

9. The device of claim 7 wherein said charge voltage switch further includes:

a switch element coupled between said output node and said reference potential a second diode coupled between said external voltage supply and a control terminal of said switch; and a resistive element coupled between said output node and said reference potential.

10. The device of claim 9 where in said second diode is a zener diode.

11. The device of claim 7, further including a third diode coupled between said battery cell terminal and said external voltage supply.

12. The device of claim 7 wherein said regulator circuit further includes means for comparing the voltage provided by said voltage divider with a reference voltage.

13. The device of claim 7 wherein said comparator further includes a first input and second input having a resistive element coupled therebetween.

14. The device of claim 7 wherein said battery cell is a lithium battery pack.

15. The device of claim 7 wherein said external voltage supply is supplied by a nonregulated rectified voltage.

16. The device of claim 15 wherein said nonregulated rectified voltage is a car battery.

17. The device of claim 7 wherein said external voltage supply is greater than the maximum charge voltage of said battery cell.

18. The device of claim 7, further including a fourth diode coupled between said first terminal and said reference potential.

* * * * *